INVENTORS
ANTON RUFLI
PETER SCHMID
ALFRED MATTMANN

BY *Abraham A. Saffitz*

ATTORNEY

INVENTORS
ANTON RUFLI
PETER SCHMID
ALFRED MATTMANN

United States Patent Office 3,393,773
Patented July 23, 1968

3,393,773
ARRANGEMENT FOR THE CONTROL OF THE DE-
SIRED VALUE DURING THE OPERATION OF
RETARDATION OF ELEVATORS WITH ROTA-
TION-SPEED-REGULATED DRIVE SYSTEM
Anton Rufli and Peter Schmid, Lucerne, and Alfred Matt-
mann, Eschenbach, Switzerland, assignors to Inventio
Aktiengesellschaft, Hergiswil, Switzerland, a corpora-
tion of Switzerland
Filed Feb. 15, 1965, Ser. No. 432,465
5 Claims. (Cl. 187—29)

ABSTRACT OF THE DISCLOSURE

A lifting device having a rotation speed control system for driving and braking on the lift cabin, and a reference device having two transmitters connected in series, one of the transmitters delivering as its output a control force which depends upon the position of the input value so that a predetermined speed is had for each journey of the lift.

---

This invention relates to an arrangement or system for the control of the desired value during the operation of retardation in lifts with rotation-speed-regulated drive system.

In speed regulated drive systems the rotation speed of the drive is in exact conformity, except for a small value corresponding to the static control deviation, with a desired rotation speed which is imposed by means of a desired value setter. The desired rotation speed can here be imposed according to the nature of the control system in the form of a desired value voltage or frequency or another desired value, having a course corresponding to a desired rotation speed programme.

In lifts with speed regulated drive systems the course of the desired value is controlled for every journey of the lift according to the speed course desired in that journey. Here in an acceleration phase the speed of the lift should rise with approximately constant acceleration from zero to the rated traveling speed. This is followed over a specific journey section by travel with rated journey speed, whereupon in a retardation phase the lift speed should drop to zero again with approximately constant retardation. Very favourable traveling properties as regards accuracy of halting, traveling time and traveling comfort can be achieved, as is known, if the controlling of the desired value and of the desired value setter is effected over the entire journey distance in dependence upon the path traveled by the lift cabin namely in a manner in which the lift cabin directly actuates the desired value setter without interposition of mechanical transmission means. Thus in a journey there is allocated to every point in the lift path a lift speed corresponding to the desired speed course. The desired value setter can be controlled for example by path impulses of a digital path-measuring arrangement arranged in the lift shaft. It is however also known that this style of control finds practically no application on account of the great expense involved therewith. Admittedly this great expense can be reduced in the case of lifts where the braking distance is not greater than the minimum storey distance, in that the desired value is controlled in dependence upon travel only during the braking phase, but is controlled in dependence upon time in the other part of the journey distance. The traveling properties are not substantially impaired here. For example it is possible for a desired value setter controllable by means of a roller lever to be arranged on the lift cabin, the roller lever being shifted in the braking phase by a cam rail mounted in the lift shaft and extending over the entire braking distance. In the case of lifts with great rated traveling speed however even with this style of control the expense becomes very great, since the braking distance extends over a plurality of storeys. The influencing of the desired value setter by means of mechanical transmission means, for example a copying mechanism, does not bring any reduction in the expense but only a substantial deterioration of the traveling properties, because considerable errors in the distance measurement are unavoidable here.

In other known control arrangements for the desired value only the point of onset of the brake retardation is determined in dependence upon the distance traveled by the cabin, while in the braking phase itself the desired value is controlled in time dependence. A time-dependent control of the intended value has the advantage that it can be effected with the simplest means. A desired value voltage reducing linearly in time-dependence can be obtained for example if a condenser is discharged with constant current. However in the case of time-dependent control of the desired value it must be taken into account that the static control deviation of the rotation speed control assumes different values for different lift loads. In order to avoid the great halting errors effected thereby, the lift must be brought to a low fine-adjustment traveling speed before reaching the destination and then halted at floor level with a shaft switch. The commencement of braking must be determined here so that in the most unfavourable load case the fine-adjustment speed is still reliably reached. For the other load cases then an excessively greatly dimensioned fine-adjustment traveling distance occurs. The traveling times of the lift therefore become very great and cannot be substantially reduced even by increasing the rated traveling speed. If it is intended to improve the traveling speeds, expensive correction means must be provided which modify for example the commencement of the braking phase or the value of the brake retardation in dependence upon the load. Nevertheless for good halting accuracy it is not possible to forego final travel with fine-adjustment traveling speed, so that the gain in traveling time is modest when considered against the great expense for the correction means.

Now the present invention concerns an arrangement for the control of the desired value during the retardation action and has the purpose of bringing the advantages of travel dependent and time dependent control into application in common, while avoiding the great expense otherwise necessary for travel dependent control and the load dependent fluctuation of braking distance occurring in the case of time dependent control and necessitating travel with fine-adjustment traveling speed.

The arrangement according to the invention for the control of the desired value during the retardation operation in lifts with speed regulated drive system is characterized in that in a desired value apparatus two adjustable desired value setters are connected in series, each of which delivers as output value a part, dependent upon its position, of an input value introduced into it, the output value of the first desired value setter is the input value of the second, the first desired value setter is brought during a first part of the braking distance out of its position corresponding to the rated speed or an intermediate speed into a position of lower traveling speed by a setting arrangement working in dependence upon time and set into and out of action by switch means actuated in dependence upon the cabin position, and the second desired value setter is brought from its position of maximum output value corresponding to this lower traveling speed during the remaining part of the braking distance by a setting arrangement working in dependence upon the distance traveled by the lift cabin, into an end position which corresponds to the output value which effects halting of the lift cabin.

The invention will now be explained further hereinafter with reference to an example of embodiment of the object thereof which is illustrated in the accompanying drawings, wherein.

Figure 1:
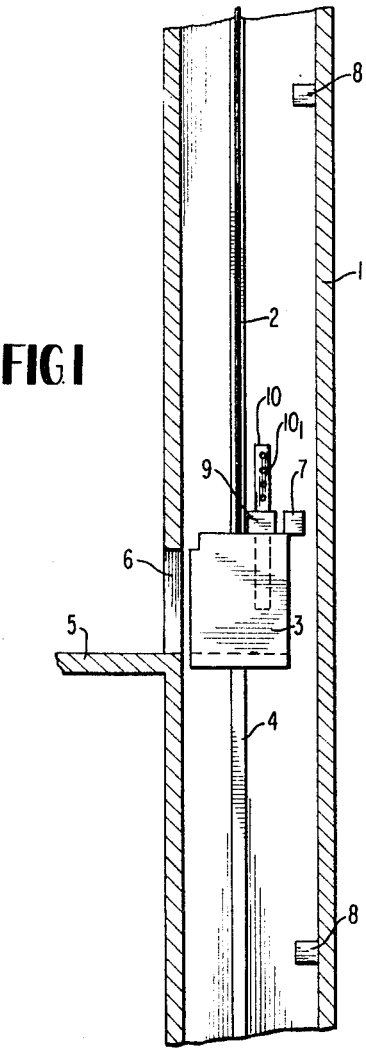
FIGURE 1 shows an elevation of a lift shaft.

In the drawings, in FIGURE 1 there is designated by 1 a section of a lift shaft in which a lift cabin 3, suspended on one or more hoisting cables 2, is guided by means of guide rails 4. The cable 2 is driven by a drive engine (not shown in this figure). The lift cabin 3 in the position as illustrated is flush with the ground level of a storey 5; 6 designates a shaft door. On the lift cabin 3 there is secured a magnetic switch 7 which is actuated by tags 8 arranged in the lift shaft 1. The magnetic switch 7 serves to instigate the braking action. In accordance with this task of the magnetic switch 7 the tags 8 are so arranged in the lift shaft 1 that when the lift cabin 3 is traveling towards the destination the magnetic switch 7 is actuated at the interval of the braking distance before the destination—which distance amounts to 8 metres in the example. Moreover on the lift cabin there is secured a photo-electric exploring apparatus 9, which explores punched strips 10 arranged in the region of every halting point in the lift shaft 1. The punched strip 10 extends over a distance dependent upon the braking distance—1.5 metres in the example—from the middle of the exploring apparatus 9 upwards and downwards when the lift cabin 3 is standing at floor level. The holes 10.1 are arranged at intervals for example of 5 mm. on the punched strip 10. In the approach of the lift cabin 3 to the destination electric pulses are generated in the exploring apparatus 9 traveling along the punched strip.

Figure 2:
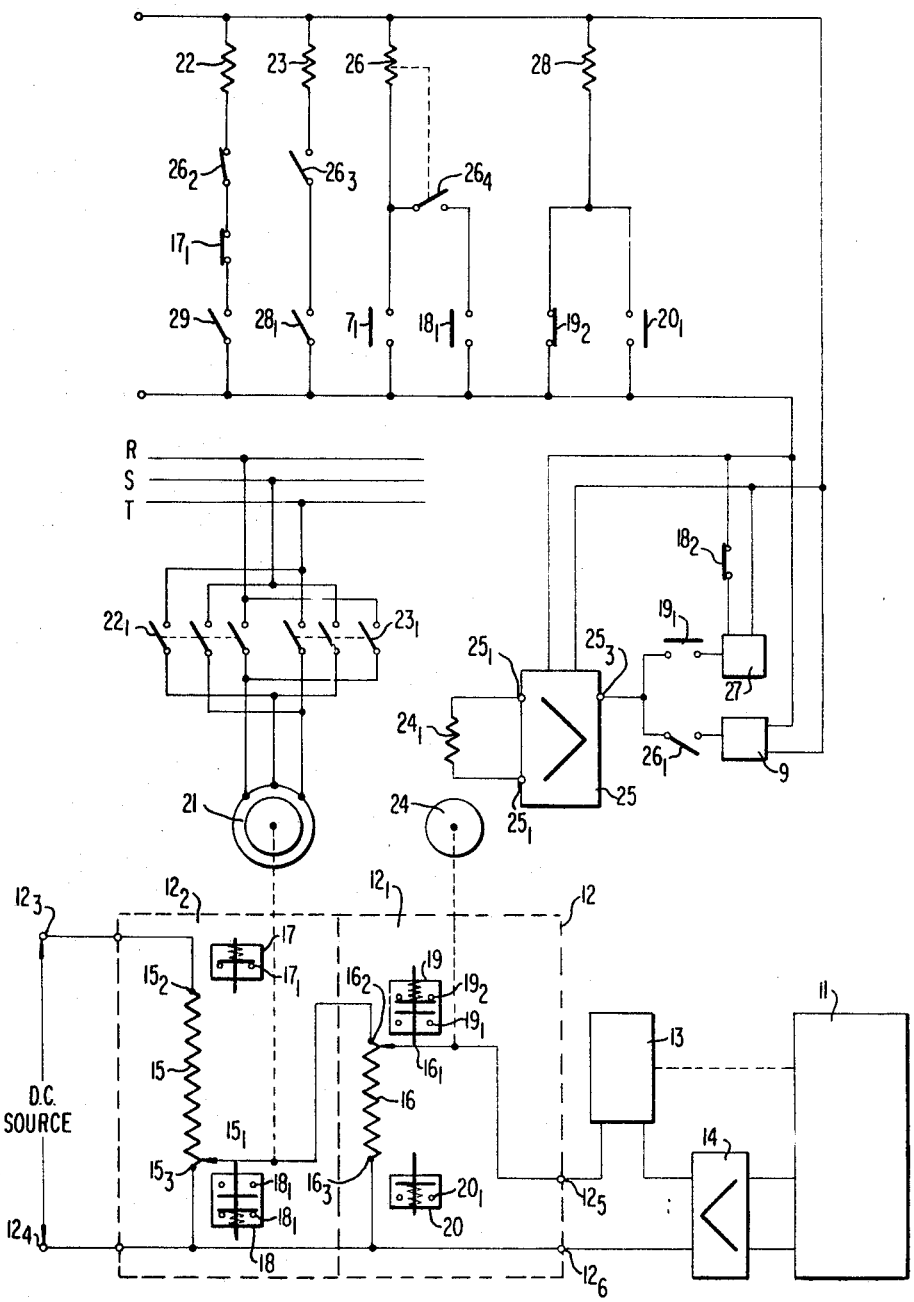
FIGURE 2 shows a circuit diagram of the electrical equipment and machines.

In FIGURE 2, 11 designates a rotation-speed-regulated drive motor. The control arrangement consists of a desired value apparatus 12, an actual value apparatus 13 and an amplifier 14 in ordinary connection. The actual value apparatus 13 can consist for example of a tachometer dynamo coupled with the drive output shaft of the drive motor and delivering a voltage proportional to the drive output rotation speed. This actual value voltage is connected in opposition to a desired value voltage proportional to a desired rotation speed and appearing at the output of the desired value apparatus 12. With the differential voltage of these two voltages the amplifier 14 is controlled, which in turn controls the drive output speed of the drive motor 11. The drive output speed of the drive motor 11 conforms exactly with the desired rotation speed except for a small value corresponding to the static control deviation.

The desired value apparatus 12 is composed of two series-connected desired value setters 12.1, 12.2, which consist essentially of the two potentiometers 15 and 16. The potentiometers 15, 16 each possess a movable tapping 15.1 and 16.1 and two fixed connections 15.2, 15.3 and 16.2, 16.3. A stabilized direct current voltage is connected to input terminals 12.3, 12.4. The input terminal 12.4 is connected with the fixed connections 15.3, 16.3 of the two potentiometers 15, 16 and with an output terminal 12.6. The input terminal 12.3 is connected with the fixed connection 15.2 of the potentiometer 15. The tapping 15.1 is conducted to the connection 16.2 and the tapping 16.1 to an output terminal 12.5. In the desired value setter 12.1 there are further arranged two terminal switches 17, 18, which are actuated by the tapping 15.1, and in the desired value setter 12.2 there are arranged two terminal switches 19, 20 actuatable by the tapping 16.1.

The terminal switches 18, 19 each possess a break contact 18.1 and 19.1 respectively and a make contact 18.2 and 19.2 respectively. The terminal switch 17 possesses a break contact 17.1 and the terminal switch 20 possesses a make contact 20.1.

The movable tapping 15.1 of the potentiometer 15 is driven by a synchronous motor 21 serving as time dependent setting arrangement. The feed of the synchronous motor 21 takes place through the three-pole contacts 22.1, 23.1 of two rotation-direction contactors 22, 23 from a three-phase current mains RST. On closing of one of the contacts 22.1, 23.1 the tapping 15.1 is displaced with constant speed, so that the tapped voltage varies in proportion with the time of switching on of the synchronous motor.

A stepping motor 24 serves for the movement of the tapping 16.1. 24.1 designates the energizing winding of the stepping motor. This is supplied by current pulses appearing at the output terminals 25.1, 25.2 of a pulse amplifier 25. For the forward stepping of the stepping motor 24 the photo-electric exploring apparatus 9 arranged on the lift cabin 3 is connected by means of a contact 26.1 to the input 25.3 of the pulse amplifier. The reverse stepping of the stepping motor 24 is effected by a pulse generator 27 which is connectable through the break contact 19.1 of the terminal switch 19 to the amplifier input 25.3. For supplying the pulse amplifier 25, the exploring apparatus 9 and the pulse generator 27 a direct current voltage source is provided the positive terminal of which is designated by + and the negative terminal by —. While the pulse amplifier 25 and the exploring apparatus 9 are connected directly to the direct current voltage source, the pulse generator 27 is connectable thereto through the make contact 18.2 of the terminal switch 18. Since the exploring apparatus 9 explores the punched strip 10 secured in the lift shaft 1, the stepping motor is stepped forwards in proportion to the distance traveled by the lift cabin 3, so that then the voltage available at the tapping 16.1 of the potentiometer 16 varies in proportion with the cabin travel.

The direct current voltage source with the terminals + and — serves further for the supply of the energizing coils of the rotation-direction contactors 22, 23 of a relay 26 and a relay 28. In the circuit of the contactor 22 there are connected in series a brake contact 26.2 of the relay 26, the contact 17.1 of the terminal switch 17 and a make contact 29 of a control relay of the lift control arrangement (not shown). The make contact 29 closes at the commencement of a lift journey and opens at the end of the journey. In the circuit of the contactor 23 there is a series circuit of a make contact 26.3 of the relay 26 and a make contact 28.1 of the relay 28. The relay 26 is energizable through a make contact 7.1 of the magnetic switch 7 according to FIGURE 1. After energization has taken place the relay 26 remains pulled up through the self-holding contact 26.4 and the break contact 18.1 of the terminal switch 18. The parallel connection of the two make contacts 19.2, 20.1 of the terminal switches 19 and 20 is connected into the circuit of the relay 28.

The above-described arrangement works as follows:

Let it be assumed that the lift cabin is at rest at one of the floors (not shown in FIGURE 1) with the control arrangement switched on. With the exception of the relay 28, which is energized and therefore holds its make contact 28.1 closed, the apparatuses are situated in the position as shown in FIGURE 2.

The desired value voltage has the value zero, since the tapping 15.1 is connected directly with the input terminal 12.4 of the desired value apparatus 12. If now the lift control arrangement receives the command to control the lift cabin 3 to the storey 5, then it closes the make contact 29. The direction contactor 22 is energized through the contacts 17.1, 26.2 and closes the three-pole contact 22.1. The synchronous motor 21 receives current and moves the tapping 15.1 of the potentiometer 15 with constant speed towards the connection 15.2. At the commencement of the movement of the tapping 15.1 the terminal switch 18 closes its contact 18.1 and opens its contact 18.2. The desired value voltage at the terminals 12.5, 12.6 rises, so that the drive motor 11 sets the lift cabin 3 in motion and accelerates it until the desired value voltage has reached the maximum value, that is to say the lift cabin 3 has reached the rated traveling speed. When this value is reached the tapping 15.1 actuates the terminal switch 17. The contact 17.1 is opened, whereby the circuit of the direction contactor 22 is interrupted. The latter drops off, opens the three-pole contact 22.1 and thus halts the synchronous motor 21. The lift cabin 3 now travels with rated speed towards the destination 5.

When the lift cabin 3 is situated at a distance of 8 meters before the destination 5, the tag 8 actuates the magnetic switch 7. The latter briefly closes its contact 7.1, whereby the relay 26 is energized and effects self-holding through the contact 18.1 and the self-holding contact 26.4. By the closing of the contact 26.1 the exploring apparatus 9 is connected to the amplifier 25, but without effect, since the exploring apparatus is still situated outside the punched strip 10. The contact 26.2 opens and the contact 26.3 closes. The direction contactor 23 is energized, its three-pole contact 23.1 switching on the synchronous motor 21 oppositely to the prior direction of rotation. The tapping 15.1 of the potentiometer 15 is now moved with constant speed towards the connection 15.3. The terminal switch 17 here closes its contact 17.1 without effect. The desired value voltage at the terminals 12.5, 12.6 drops off and so also does the traveling speed of the lift cabin 3. At a distance of 1.5 metres before the destination 5 a first pulse is generated in the exploring apparatus 9, which at this moment comes into the region of the punched strip 10. This pulse passes through the amplifier 25 to the energizing winding 24.1 and steps the stepping motor one step further, in such manner that the tapping 16.1 of the potentiometer 16 is displaced by one small step towards the connection 16.3. At the commencement of this movement of the tapping 16.1 the terminal switch 19 is actuated, so that the latter closes its contact 19.1 and opens its contact 19.2. The closing of the contact 19.1 remains without effect, since the supply lead of the pulse generator 27 is interrupted by the contact 18.2. On the other hand due to the opening of the contact 19.2 the circuit of the relay 28 is opened and by its contact 28.1 the circuit of the direction contactor 23 is opened, so that the latter drops off, opens its contact 23.1 and thus interrupts the movement of the tapping 15.1. On further travel of the lift cabin 3 now the tapping 16.1 is shifted step by step by the pulses generated by means of the punched strip 10 in the exploring apparatus 9, in dependence upon the distance traveled by the lift cabin 3, towards the connection 16.3. The desired value voltage at the terminals 12.5, 12.6 and thus the traveling speed of the lift cabin are here constantly reduced, a fixed traveling speed being allocated to each point of travel of the cabin 3. The number of the holes 10.1 of the punched strip 10 is so dimensioned that the last pulse before the lift cabin 3 comes flush with the floor level pushes the tapping 16.1 to the connection 16.3. The desired value voltage here becomes zero, so that the lift cabin 3 is brought to a halt. At the same time the terminal switch 20 is actuated, that is to say the contact 20.1 is closed. The relay 28 pulls up again, closes the contact 28.1 and thus causes the direction-contactor 23 to pull up again and the synchronous motor 21 to shift the tapping 15.1 now further towards the connection 15.3, in which case however the desired value voltage at the terminals 12.5, 12.6 does not change the value zero.

During this time the lift control opens the contact 29, which can be switched on again only when the desired value apparatus 12 is brought back into the original position as shown. This takes place directly after the tapping 15.1 has reached its end position. The terminal switch 18 is then actuated, opens the contact 18.1, whereby the relay 26 and direction-contactor 23 drop off and the synchronous motor 21 is halted, and closes the contact 18.2. On closing of the contact 18.2 the pulse generator 27 is connected to the direct current voltage source (+, −) and then generates pulses which pass through the amplifier 25 to the energizing winding 24.1 of the stepping motor and step the latter forwards in such manner that the tapping 16.1 is returned into its initial position. At the commencement of this movement the terminal switch 20 opens its contact 20.1. The relay 28 drops off and opens the contact 28.1, but without effect, since the contact 26.3 is already opened. At the end of the return movement of the tapping 16.1 the terminal switch 19 is actuated. This closes its contact 19.2, whereby the relay 28 is brought into the initial position. The contact 19.1 further opens, whereby the pulse generator 27 is separated from the amplifier 25 and the stepping motor 24 is halted. The apparatuses are now again situated in their initial position and are ready to receive a further journey command.

For journeys over shorter distances, in which the rated traveling speed cannot be reached, as usual a number of intermediate traveling speeds, mostly two, are determined, namely by further terminal switches 17 (not shown). These terminal switches 17 are arranged along the potentiometer 15 in accordance with the desired value voltages necessary for these maximum traveling speeds, and analogously with the terminal switch 17 as illustrated halt the synchronous motor 21 on actuation by the tapping 15.1. In the lift shaft 1 there are arranged further tags 8 (not shown) in accordance with the braking distances necessary for these intermediate speeds. The selection of the speed is made in the usual manner by the lift control arrangement. The terminal switches 17 and tags 8 not corresponding to the selected speed are here rendered ineffective.

The arrangement as described renders it possible for the lift cabin to travel directly to the floor with high accuracy of halting. Travel with fine-adjustment traveling speed becomes superfluous, so that the traveling times of the lift are considerably reduced. Thus the arrangement offers all the advantages of a drive system with speed regulated according to distance over the entire traveling distance, without however necessitating the great expense necessary for such a drive system.

The course of the speed in the braking phase in dependence upon time or distance can be selected according to choice, for example by appropriate dimensioning of the potentiometers 15, 16. In order to conform with the requirements usual in lift construction it is expedient to impart a substantially linear resistance distribution to the potentiometer 15 and a substantially parabolic resistance distribution to the potentiometer 16, the fact being adopted as basis that for the passenger a constant retardation is most pleasant. Constant retardation however signifies a speed decreasing linearly in dependence upon time and parabolically in dependence upon distance. Naturally in the transition from the time dependent to the distance dependent control the amount of the constant retardation will be varied more or less according to load. However in the most unfavorable case the variation is so slight that it will hardly be noticed by the passenger. The same speed course can also be achieved if both potentiometers 15, 16 possess a linear resistance distribution but the holes 10.1 on the punched strip 10 are distributed parabolically.

Figure 3:
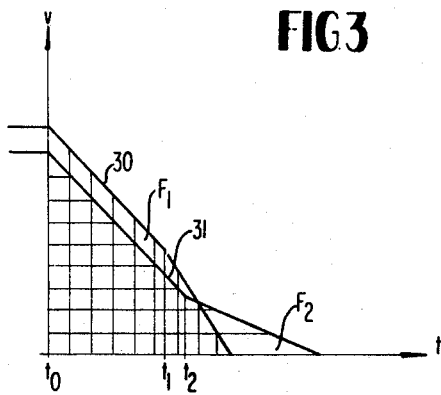
FIGURE 3 shows a graphic representation of the course of the lift speed in dependence upon time during the retardation period.
Figure 4:
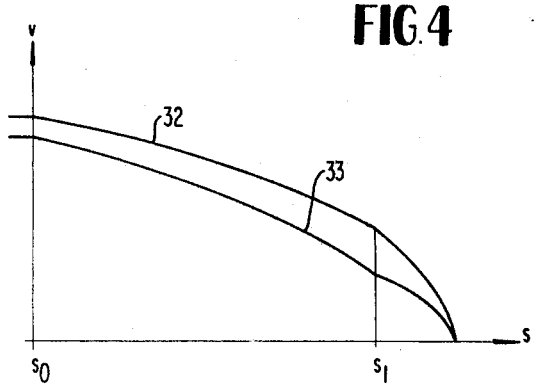
FIGURE 4 shows a graphic representation of the course of the lift speed in dependence upon the distance traveled by the lift cabin, during the retardation period.

In the diagrams in FIGURES 3 and 4 the course of the speed achievable with the described arrangement in the braking phase of the lift is represented in each case for the two most extreme load cases, traveling downwards with full load and traveling upwards with full load, namely in FIGURE 3 in time dependence and in FIGURE 4 in dependence upon the distance traveled by the lift cabin 3. Since the static control deviation assumes different values for different load cases, the rated traveling speed reached also possesses different values in these load cases.

In FIGURE 3 the time $t$ is entered on the abscissae and the speed $v$ on the ordinates. The curve 30 shows the course of the speed in a downward journey with full load and the curve 31 in an upward journey with full load. at the moment $t_0$ the lift cabin 3 passes the tag 8 and the retardation action is initiated by actuation of the magnetic switch 7. The lift is braked with constant retardation which is the same for every load case. In the load case according to the curve 30 the lift cabin comes into the region of the punched strip 10 at the moment $t_1$ and in the load case according to the curve 31 at the subsequent moment $t_2$. The desired value is controlled in distance dependence from this moment $t_1$ or $t_2$ onwards. The retardation here sets itself in such manner that the braking distance becomes the same for every load case, that is to say that the vertically hatched area $F_1$ becomes equal to the horizontally hatched area $F_2$.

In FIGURE 4 the speed $v$ is again entered on the ordinates, but the distance $s$ traveled by the lift cabin is entered on the abscissae. The course of the speed is represented for downward travel with full load by the curve 32 and for upward travel with full load by the curve 33. At the distance point $s_0$ the magnetic switch 7 is actuated by the tag 8 and thus the retardation operation is initiated. The left is braked with constant retardation in time dependence until the distance point $s_1$, at which it comes into the region of the punched strip 10. The course of the curves 32 and 33 is therefore parabolic in this section. From the distance point $s_1$ onwards, distance dependent retardation takes place until the lift comes to a halt. Due to the parabolic resistance distribution on the potentiometer 16 the retardation is constant also in this braking section, and the course of the curves 32 and 33 is parabolic. The desired value for the rotation-speed regulation here derives in every load case from the desired value voltage reached at the distance point $s_1$ and thereafter decreases in such manner that it just becomes zero when the lift cabin reaches the floor level.

The arrangement according to the invention permits of a great number of variants in construction. Thus for example the stepping means can be controlled entirely or partially by a copying mechanism. The forward stepping of the distance-dependent desired value setter 12.1 can be effected directly by shaft cam or by cam discs couplable to the copying mechanism. Moreover in place of the potentiometers 15, 16 there can be used induction regulators. In order to avoid mechanical movements and the wear phenomena involved therewith, electric desired value setters can be utilized.

What we claim is:

1. A lift arrangement with a lift cabin and rotation speed driving and braking means for said cabin; a rotation speed control system for said driving and braking means and means for the control of the reference value during the retardation action of said cabin; said means comprising a reference value device with two adjustable reference values transmitters which are connected in series; each of said reference value transmitters delivering as output value a part dependent upon its position of an input value introduced into it, the output value of said first reference value transmitter of said two being the input value of said second reference value transmitter of said two and said first reference value transmitter being brought during a first part of the braking section out of its position corresponding to the reference speed or an intermediate speed to a position of lower traveling speed by a first setting means working in time dependence and brought into and out of action by switch means actuated in dependence upon the cabin position, and said second reference value transmitter being brought from its position of maximum output value corresponding to this lower traveling speed into an end position corresponding to the output value effecting halting of the lift cabin during the remaining part of the braking section by a second setting means working in dependence upon the distance traveled by the lift cabin.

2. An arrangement as claimed in claim 1 in which said first reference value transmitter comprises a potentiometer with linear resistance distribution and said first time dependent setting arrangement comprises an electric motor in the form of a synchronous motor, shifting the movable tapping of said potentiometer; said motor being connected to a supply network by means of a shaft switch at the beginning of the braking distance of said lift cabin and is separated from said network again by means of a switch actuated by said second reference value transmitter on leaving its initial position.

3. An arrangement as claimed in claim 1, in which said second reference value transmitter comprises a potentiometer with movable tapping means and said second distance dependent setting arrangement comprises a stepping motor which shifts said movable tapping means of said potentiometer and is stepped forward step by step by a photoelectric exploring apparatus arranged on the lift cabin on exploration of current pulses generated by a punched strip, the punched strip being arranged in the lift shaft in the last part of the braking distance and having as many holes as the stepping motor needs pulses in order to shift the tapping of the potentiometer from the one end position into the other.

4. A lift arrangement with a lift cabin and rotation speed driving and braking means for said cabin; a rotation speed control system for said driving and braking means and an arrangement for the control of the reference value during the retardation action of said cabin; said arrangement comprises a reference value device with two adjustable reference value transmitters, which are connected in series said first reference value transmitter comprises a first potentiometer with linear resistance distribution and said second reference value transmitter comprises a second potentiometer; each of said reference value transmitters delivers as output value a part dependent upon its position of an input value introduced into it, the output value of said first reference value transmitter being the input value of said second reference value transmitter and said first reference value transmitter being brought during a first part of the braking section out of its position corresponding to the reference speed or an intermediate speed to a position of lower traveling speed by a first setting arrangement working in time dependence and brought into and out of action by switch means actuated in dependence upon the cabin position; and said second reference value transmitter being brought from its position of maximum output value corresponding to this lower traveling speed into an end position corresponding to the output value effecting halting of the lift cabin during the remaining part of the braking section by a second setting arrangement working in dependence upon the distance traveled by the lift cabin; said time dependent setting arrangement comprises an electric motor in the form of a synchronous motor, shifting the movable tapping of said potentiometer; said motor being connected to a supply network by means of a shaft switch at the beginning of the braking distance of said lift cabin and is separated from said network again by means of a switch actuated by said second reference value transmitter on leaving its initial position; said second reference value transmitter comprises a potentiometer with movable tapping means and said second distance dependent setting arrangement comprises a stepping motor which shifts said movable tapping means of said potentiometer and is stepped forward step by step by a photoelectric exploring apparatus arranged on the lift cabin on exploration of current pulses generated by a punched strip, the punched strip being arranged in the lift shaft in the last part of the braking distance and having as many holes as the stepping motor needs pulses in order to shift the tapping of the potentiometer from the one end position into the other, said potentiometer for the distance dependent in position of reference values possesses a linear resistance distribution and the punched strip possesses a parabolic distribution of holes.

5. An arrangement according to claim 4 in which said potentiometer for the distance dependent in position of desired values possesses a parabolic resistance distribution and the punched strip possesses a linear distribution of holes.

No references cited.

ORIS L. RADER, *Primary Examiner.*

THOMAS E. LYNCH, *Assistant Examiner.*